June 12, 1956 H. N. STEPHAN 2,749,806
TOOL SPINDLE MECHANISM
Filed April 3, 1953 4 Sheets-Sheet 2
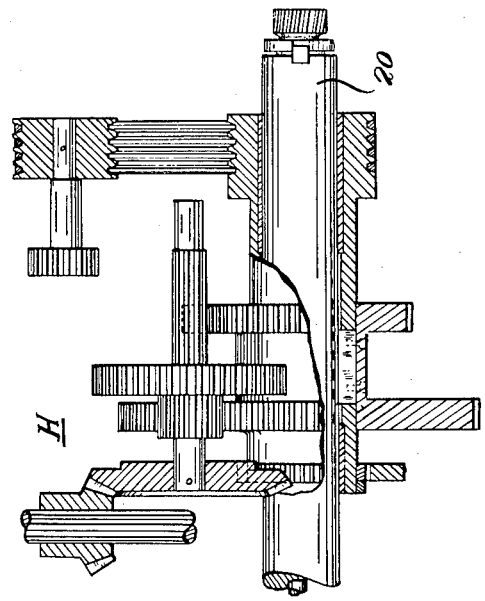
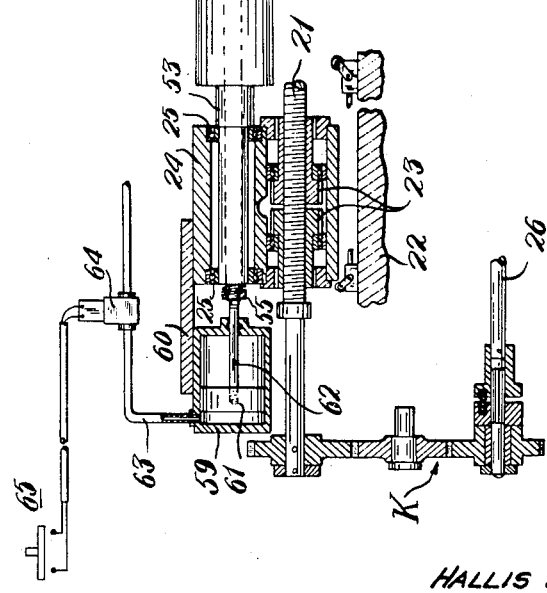
FIG. 2
INVENTOR.
HALLIS N. STEPHAN
BY Hudson, Boughton,
Williams, David & Hoffmann
ATTORNEYS June 12, 1956 H. N. STEPHAN 2,749,806
TOOL SPINDLE MECHANISM
Filed April 3, 1953 4 Sheets-Sheet 3
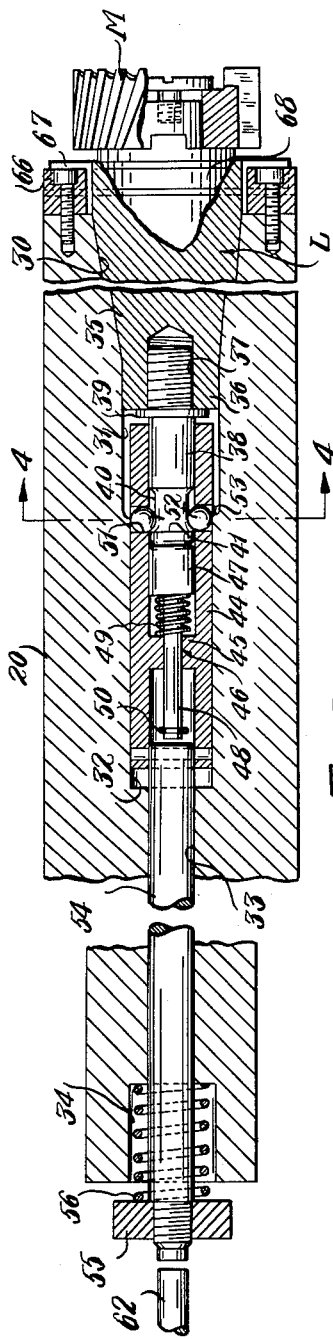
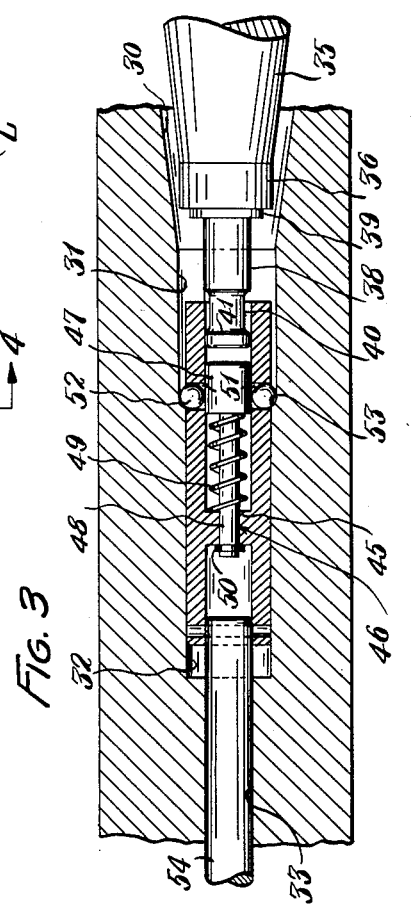
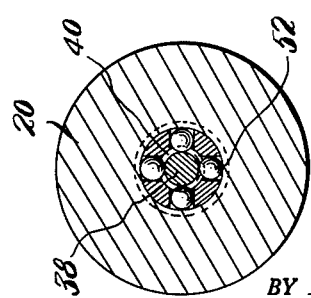
INVENTOR.
HALLIS N. STEPHAN
BY Hudson, Boughton
Williams, David & Hoffmann
ATTORNEYS June 12, 1956  H. N. STEPHAN  2,749,806
TOOL SPINDLE MECHANISM
Filed April 3, 1953  4 Sheets-Sheet 4
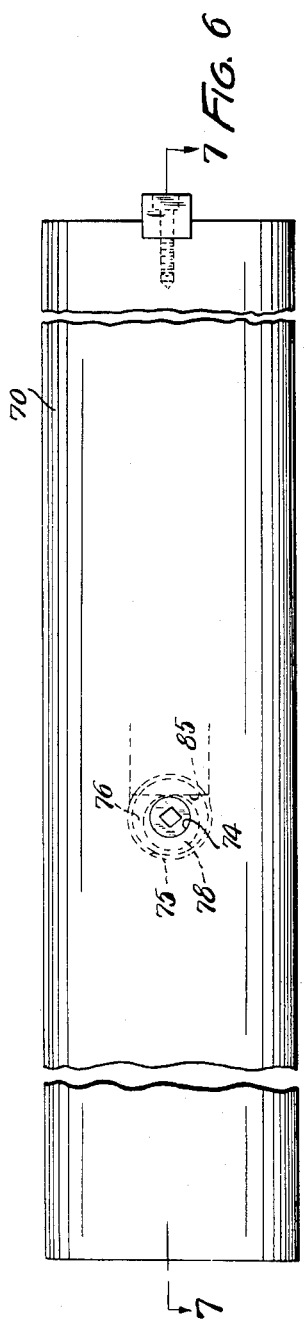
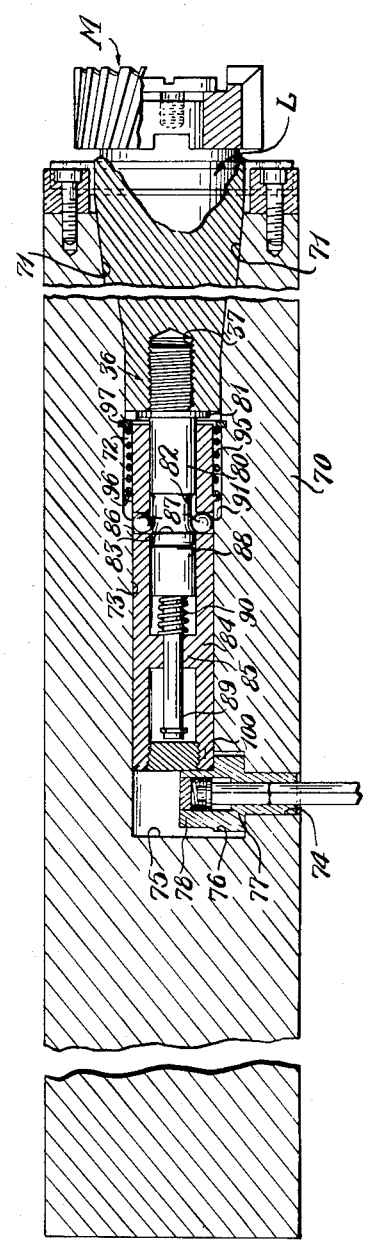
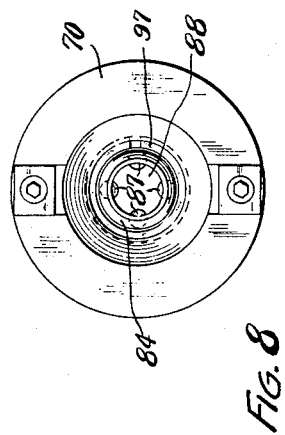
INVENTOR.
HALLIS N. STEPHAN
BY Hudson, Doughton,
Williams, David & Hoffmann
ATTORNEYS United States Patent Office 2,749,806
Patented June 12, 1956

2,749,806

TOOL SPINDLE MECHANISM

Hallis N. Stephan, Cleveland Heights, Ohio, assignor to The New Britain Machine Company, New Britain, Conn., a corporation of Connecticut Application April 3, 1953, Serial No. 346,651

11 Claims. (Cl. 90—11)

The present invention relates to machine tools and, more particularly, to the tool spindle mechanism thereof and to means for locking or binding the tool in place in the tool spindle.

The principal object of the present invention is the provision of a new and improved machine tool and particularly a combined horizontal boring, drilling and milling machine having a spindle provided with novel means for releasably securing a tool arbor, or similar device in the receiving aperture or socket of the spiindle so that it may be quickly and easily inserted into or removed from the spindle.

Another object of the present invention is the provision of a new and improved machine tool and particularly a combined horizontal boring, drilling and milling machine having a novel spindle construction including a locking or binding device for releasably securing an arbor or a similar device in the aperture or socket of the spindle, which device has a locking position and a releasing position and is always maintained in the releasing position when an arbor is not in position within the spindle socket.

A further object of the present invention is the provision of a new and improved tool spindle having a locking or binding device for releasably securing a tool, arbor, or similar device in the socket of the spindle, the locking device being so constructed and arranged that it is actuated to its holding or binding position by the insertion of the tool device in the spindle socket and, upon the removal of the tool device, is maintained in its open or released position ready to again receive and secure a tool device in the spindle.

The invention resides in certain constructions, combinations and arrangements of parts, and further objects and advantages of the invention will be apparent to those skilled in the art to which it relates from the following description of the preferred embodiments described with reference to the accompanying drawing forming a part of this specification and in which:

Fig. 2 is a fragmentary view of the machine shown in Fig. 1, partly in section and partly schematic, showing the tool spindle and certain parts of the driving mechanism therefor;

Fig. 3 is a sectional view of the tool spindle showing a conventional milling machine cutter attached therein;

Fig. 4 is a sectional view taken along lines 4—4 of Fig. 3;

Fig. 5 is a fragmentary sectional view of the tool spindle showing the locking or holding device in its released position which enables an arbor or tool to be inserted therein or removed therefrom;

Fig. 6 is an elevational view of a modified tool spindle embodying my invention;

Fig. 7 is a sectional view of the tool spindle taken along lines 7—7 of Fig. 6 with an arbor positioned in the spindle; and Fig. 8 is a side elevational view of the tool spindle of Fig. 6.

Figure 1:
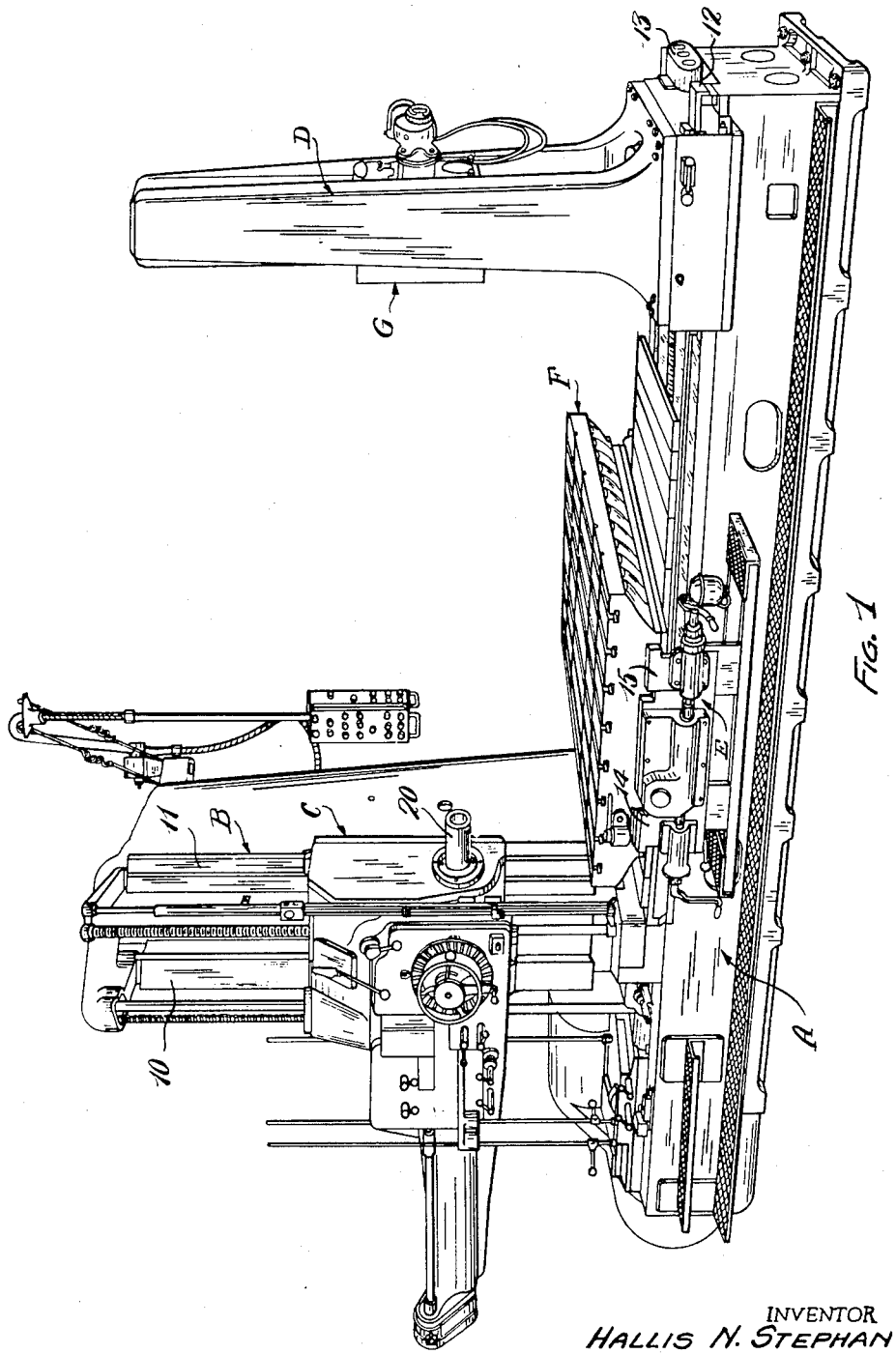
Fig. 1 is a perspective view of a combination horizontal boring, drilling and milling machine embodying the present invention.

The present invention is suitable for use in various machine tools having a rotatable tool spindle or other type tool holder with a socket in the forward end thereof to receive a tool holding device and, in general, provides a locking or binding device comprising a means for connecting the tool holding device in the spindle socket, the connecting means having a connecting and releasing position, spring means to yieldably urge said connecting means to its connecting position, releasable means to maintain the connecting means in its releasing position, the releasable means being released by the insertion of a tool holding device allowing the spring means to move the connecting means to its connecting position. The invention is particularly useful in combined horizontal boring, drilling and milling machines where the spindle length is such that an operator cannot reach both ends of the spindle at the same time.

Referring to the drawings, I have shown a combination horizontal boring, drilling and milling machine which embodies the new and improved tool spindle mechanism. The machine shown is generally similar to that disclosed in the U. S. patent to Lucas et al. 2,350,174 and comprises a base A, provided at one end with a spindle head column B formed with vertical ways 10 and 11 upon which a spindle head C is mounted for vertical movement, and at the other end with a brackrest or an outboard support column D slidably supported on horizontal ways 12 and 13 on the upper side of the bed. The ways 12 and 13 also support a saddle E having transversely extending horizontal ways 14 and 15 on the upper side thereof which in turn supports a work table F. The backrest column D has vertical ways upon which a backrest block G is mounted for vertical movement. The spindle head, outboard support column D, saddle E, table F and backrest block G may be moved in any conventional mechanism the details of which are not necessary for the understanding of the present invention and are not shown.

The spindle head C supports a tool spindle 20, which spindle is adapted to be rotated by suitable driving mechanism indicated generally at H and which is more fully explained in the patent mentioned. The spindle 20 is also adapted to be fed or rapid traversed axially in either direction by a lead screw 21 rotatably supported in a part 22 of the spindle head and having threaded engagement with a two piece anti-blacklash nut 23, located within the feed slide 24 which is carried by the spindle head C and connected to the spindle 20 adjacent to the left hand end or rear of the spindle by bearings 25. The lead screw 21 is adapted to be rotated manually or by power and in either direction and at different speeds through a suitable power transmission including the shaft 26 and the gears K. Since the construction of such mechanisms is conventional and not essential to the understanding of the present invention, they are not shown.

The forward end or nose of the spindle 20 is preferably provided with an aperture fashioned to receive the arbors of conventional milling machine tools and as shown has the form of an aperture or tapered socket 30 terminating in a cylindrical bore 31 the diameter of which in the embodiment shown is about one-third that of the spindle. The inner end of the bore 31 communicates with an axial bore 32 which is slightly smaller in diameter than the bore 31 and in turn communicates with an axial bore 33 extending to the rear end of the spindle. The portion of the bore 33 adjacent to the rear end is enlarged as at 34, the purpose of which will appear as the description proceeds. The socket 30 and bore 31 are adapted to receive a conventional milling machine tool arbor L the tapered shank 35 of which corresponds to the taper of the socket 30, and the rear cylindrical portion or pilot 36 of which fits into the bore 31. The pilot 36 is provided with the conventional tapped or threaded hole 37. The arbor is provided with an adapter or lock plug 38 threaded into the hole 37 before the arbor is inserted in the socket 30. The lock plug 38 has an annular shoulder 39 which abuts the end of pilot 36, and a peripheral groove 40 formed about the plug adjacent to the outer end thereof provides a shoulder 41 for engagement by a binding or locking device located in bore 32. A conventional milling cutter M is connected to the arbor L in the usual manner.

According to the present invention the locking or binding device for the arbor L comprises a sleeve 44 which has a transverse wall 45 intermediate its ends. The sleeve 44 is axially movable in the bore 32 and is adapted to receive the left hand end of the plug 38 therein. Movably mounted within the end of the sleeve which receives the plug 38 is a piston-like member 46 comprising a head 47 and a rod 48. The head 47 is of approximately the same diameter as the internal diameter of the sleeve 44 and the rod 48 extending therefrom extends through a passage in the transverse wall 45 and is slidable therein. The piston member 46 is biased outwardly by a spring 49 on the rod 48 between the wall 45 and the head 47. The outward movement of the piston 46 is limited by a stop ring 50 on the end of rod 48 which abuts the transverse wall of the sleeve 44 when the spring forces the piston member outwardly.

The sleeve 44 has a plurality of radial openings therein, preferably four equally spaced openings, all lying within a plane transverse to the sleeve axis near the end of the sleeve which receives the plug 38. Each opening 51 contains a locking member or steel ball 52. When the arbor L is in the socket 30 the sleeve 44 is in the position as shown in Fig. 3 and the walls of the bore 32 force the balls 52 to project inwardly of the sleeve wall and enter the groove 40 of the plug 38. When the sleeve is moved forwardly from the position shown in Fig. 3 to the position shown in Fig. 5, the balls are carried from bore 32 to bore 31 and may easily be moved to project outwardly of the sleeve into the outer bore 31 as shown, permitting the plug 38 to move freely into and out of the sleeve. When the plug 38 is removed from the sleeve 44 the piston 46 will follow the exit of the plug 38 and aid in its withdrawal due to the action of spring 49. Withdrawing the end of the plug 38 will force the balls radially outwardly to allow its release and the head 47 will follow the plug 38, engage the balls 52, and maintain them in their outward position. The sleeve will be prevented from being retracted into its inward position, which position is shown in Fig. 3, as long as the balls 52 are in their outward position in bore 31 since they will abut against the abutment or ledge 53 between the bore 31 and the reduced bore 32. By this arrangement the sleeve 44, the piston 46, and the balls 52, provide a quick acting locking or binding device for securing the arbor L in the socket 30, which device is operated by moving the sleeve 44 inwardly of socket 32 to force the balls 52 into the groove 40 and into engagement with the shoulder 41 of the plug 38 to connect the sleeve to the plug, thereby holding the arbor in the socket 30 and preventing withdrawal of the arbor from the spindle. When the sleeve 44 is moved forwardly the arbor is released and the sleeve 44 is maintained in its forward position ready to receive the plug 38 carried by the arbor to again secure the arbor in position. The removal of the arbor is facilitated by the action of spring 49 which will force the head 47 against the plug 38 to aid in its removal from the end of the sleeve 44 as well as functioning to maintain the sleeve in outward position when the arbor is not in place. The proportions are such that when the piston-like member 46 is in its forward position, the head 47 thereof closes the inner ends of the openings 51, as illustrated in Fig. 5.

In the preferred form of the invention, the sleeve 44 is pinned to the forward end of a longitudinally movable actuating rod 54 which projects through the bore 33 and extends beyond the rear end of the spindle as seen in Fig. 3. The outer end of the actuating rod 54 has a nut 55 threaded thereon and a relatively heavy compression spring 56 is disposed between the nut 55 and the inner end of the bore 34 so that the rod 54 is normally urged to the left as viewed in Fig. 3 to bias the sleeve 44 to the locking position. The tension of spring 56 is such that when the arbor L is secured in the socket 30 by the locking device the spring exerts the force necessary to maintain the arbor fixed in the socket under working or operating conditions. When no tool or other device is in the socket 30, the spring 56 maintains the steel balls 52 in snug engagement with or wedged between the ledge 53 and the head 47 which prevents retraction of the sleeve 44 to its tool arbor binding or locking position, thereby keeping the device ready for insertion of a tool holder.

It will be seen that by moving the rod 54 to the right, sleeve 44 is moved forwardly to release the arbor from the socket, and in the preferred form of the invention the rod is moved forwardly by power means, which in the present case comprises a pneumatic motor including a cylinder 59 supported on the feed slide 24 by a support 60 so that it moves axially with the spindle. The cylinder 59 has a piston 61 therein having a piston rod 62 which is adapted to engage the outer end of the rod 54. The rear end of the cylinder 59 is connected by a flexible conduit or pipe 63 with a suitable source of fluid pressure such as a compressed air tank, not shown, and the flow of air to and from the cylinder is controlled by a conventional solenoid valve 64 which when energized directs air pressure into the cylinder and when deenergized releases air from the cylinder. The solenoid valve is preferably controlled by a push button switch 65 which may be placed in a convenient location on the spindle head in the vicinity of the forward or nose end of the spindle, which is generally four or five feet from the rear end. The construction is such that an operator in attaching or detaching a tool to the spindle may operate the locking mechanism within the spindle merely by depressing the switch 65.

The groove 40 is elongated as shown, permitting relative longitudinal movement between the member 38 and the sleeve 44 with the result that when the parts are in the position shown in Fig. 3 with the tool arbor locked in the socket 30, forward movement of the rod 62 by the piston 61 forces the outer end of the sleeve 44 against the shoulder 39 of the plug 38 to force the tool arbor from the socket, in the event it sticks therein, as the locking sleeve moves to the tool releasing position. The movement of rod 54 in the tool releasing direction is limited by the nut 55 engaging the end of the feed slide 24. The sizes of the various parts are preferably so proportioned that when the arbor L is inserted into the socket 30 the balls 52 will not drop into the groove 40 and the locking mechanism will not operate to bind the arbor in the socket, but the arbor will be left free to drop out, unless the normally provided keys 66 are properly engaged in the usual slots 67 provided in the arbor flange 68. It is evident that the sleeve 44 will be normally held in its forward position by the engagement of the balls 52 with the ledge 53 and will be actuated to its inward or locking position by the spring 56 upon the insertion of the plug 38 into the sleeve which allows the balls 52 to drop inwardly of the sleeve wall, thereby enabling the spring 56 to move the sleeve inwardly to its connecting position with a snap action.

The construction shown is quick acting, efficient and may be conveniently controlled by the machine operator, although the spindle may be several feet in length. The mechanism is of relatively simple design and it can be readily assembled. For example, the rod 54 having the sleeve 44 including the member 46 thereon is inserted into bore 33 through socket 30 until the rear end projects from the far end of the spindle. Spring 56 is then positioned in bore 34 and nut 55 threaded onto the rod and against the spring. The outer ends of the holes 51 may be peened to prevent the balls 52 from falling out during assembly, if desired. By operating the locking or binding device by axial movement of the rod 54, no twisting or other like stresses which are present during operation of the machine have a tendency to loosen the grip of the locking device on the tool, as would be the case, for example, in the event the plug 38 was intergral with the rod 54 and threaded into the hole 37 as by a torque motor at the rear end of the spindle.

The socket 30 shown has the taper of a standard milling machine spindle so as to permit the use of standard milling arbors, tools, bars, etc., but it is to be understood that any suitable taper can be employed. It is also to be understood that in the event special arbors are to be provided, many changes can be made, for example, the member 38 may be formed integral with the arbor or the like. It is made detachable from the arbor in the present instance so as to adapt the locking means shown for use with conventional milling machine tools.

Referring now to the embodiment of the invention shown in Figs. 6, 7 and 8, a combined horizontal boring, drilling and milling machine tool spindle embodying the invention is generally designated by the reference numeral 70 which, like the spindle 20, is adapted to receive the shank or arbor of conventional milling machine tools. The forward or nose end of the spindle is provided with a tapered socket 71 terminating in a bore 72 extending axially of the spindle. The socket 71 is tapered to receive the tapered arbor L for a conventional milling machine tool M and the bore 72 receive the cylindrical pilot 36 of the arbor. The bore 72 communicates with a coaxial bore 73 of slightly less diameter than the bore 72. A transversely extending bore 74 is provided in the spindle which opens into the rear portion of the bore 73 and the bore 74 is counterbored at 75 to accommodate an enlarged portion 76 of a member 77 the shank of which is rotatably supported in the bore 74. The enlarged portion 76 has an eccentric or cam 78 projecting therefrom.

As mentioned, the conventional milling machine arbor L, described with reference to the first embodiment of the invention, is adapted to be received in the tapered socket 71 and a plug 80 is threaded into the threaded hole 37 in the arbor. The plug 80 is similar to the plug 38 and has a shoulder 81 corresponding to the shoulder 39 which is adapted to engage the inner end of the arbor and the outer end thereof is provided with a groove 82 corresponding to the groove 40 which groove 82 forms a forwardly facing shoulder 83 adjacent to the outer end of the plug.

A binding or locking mechanism is slidably supported in the bores 72 and 73 and comprises a sleeve 84 closed at its inner end and adapted to receive the rear projecting end of the adapter or plug 80 in the forward end thereof. The sleeve 84 is preferably formed with a transverse wall 85 intermediate its ends and with four radial circumferentially spaced openings 86 through its side wall, which openings lie in a plane normal to the sleeve axis near the forward end of the sleeve. Each opening has a locking member or steel ball 87 therein, the diameter of which is greater than the thickness of the sleeve walls so that they project from one end or the other of the openings. Mounted within the forward end of the sleeve 84 is a piston-like member having a head 88 and a rod 89 extending from the rear portion of the head. The shaft 89 extends through an opening in the transverse wall 85. The head 88 of the piston-like member is biased toward the forward end of the sleeve 84 by a spring 90 which is interposed between the head 88 and the transverse wall 85 in the sleeve 84. When the arbor L is not in position in the spindle and the sleeve 84 is moved forward so openings 86 are within bore 72, the piston-like member will move toward the forward end of the sleeve 84 to engage and hold the balls 87 so that they project externally of the sleeve 84. The diameter of the head 88 closely approximates the internal diameter of sleeve 84 in order to hold the balls in their outward position and operates in the same manner as the piston-like member of the previously described embodiment to lock the sleeve 84 in its forward position. The balls 87 when projected outwardly into the bore 72 will engage the abutment or ledge 91 between bores 72 and 73 to prevent the sleeve from moving inwardly. When the plug 80 is inserted into the sleeve 84, the head 88 is forced inwardly and the balls will drop into the groove 82 in the plug of the adapter, which corresponds to the groove 40 of the previously described embodiment, allowing the sleeve to be moved inwardly of the tool spindle. When the sleeve moves inwardly the side walls of the bore 73 will engage the balls 87 and prevent their outward movement to release the plug from the sleeve 84.

The sleeve 84 is normally biased to its inward position by a heavy compression spring 95 in bore 72 which bears against an annular shoulder 96 projecting outwardly from the sleeve. The spring 95 is coaxial with the bore 72 and abuts against the inward side of a snap ring 97 mounted in a groove in the wall of the bore 72. The spring 95 exerts sufficient pressure to maintain the sleeve in its inward position during the operation of the tool.

The sleeve 84 may be moved outwardly with respect to the bore 73 against the tension of spring 95 to carry the balls 87 outwardly into the bore 72 for the purpose of releasing the arbor L by the eccentric or cam 78 located within the end portion of the bore 73. The eccentric or cam 78 is adapted to engage the inner end of the sleeve 84 which is held in engagement with the cam by spring 95 when the sleeve is in its locking position. The construction is such that rotation of the cam will cause the sleeve 84 to move axially. The bottom of the inner end of the sleeve 84 rests on a shoulder 100 between the cam 78 and the enlarged portion 76 which assures that the cam mechanism will be held in position within the bore 75.

It will be apparent that when the arbor L is in position within the socket 71, the sleeve 84 is in a locking or connecting position with the balls 87 engaging the side walls of bore 73 and projecting inwardly of the side walls of sleeve 84 to engage the shoulder 83 of plug 80 and prevent movement of the arbor in a forward direction. The sleeve 84 is yieldingly held against forward movement by spring 95. The balls 87 are prevented from moving outwardly of the sleeve and releasing the arbor L by the side walls of the bore 73 acting as a cam surface. To release the arbor from its locked position the cam 78 is rotated. This moves the sleeve 84 axially to a forward position, moving the steel balls into bore 72 and enabling them to move externally of the side walls of sleeve 84. When the balls move outwardly of the sleeve 84 the arbor L may be withdrawn from the socket. The arbor normally sticks or freezes in the spindle socket and in this event the forward end of the sleeve 84, which is slightly smaller than the opening in the ring 97, will abut the shoulder 81 and push the arbor out of the socket. The head 88 which is spring biased in a forward direction will aid the removal of the arbor L and will also follow its exit and engage the balls 87 before they have an opportunity to drop into the sleeve 84. The head 88 will hold the balls 87 in their externally projected position where, in cooperation with the ledge between the bore 72 and bore 73, they prevent the return of the sleeve to its inward position. The sleeve 84 is always in its forward releasing position unless an arbor is inserted in the sleeve 84 to force the head 88 inwardly and allow the balls 87 to drop inwardly of the sleeve walls.

From the foregoing it will be apparent that the objects heretofore enumerated and others have been accomplished and that there has been provided a novel and improved mechanism for releasably securing an arbor in position in the receiving aperture or socket of a tool spindle. While the preferred embodiments of the invention have been described in considerable detail, the invention is not limited to the particular construction shown, and it is my intention to cover hereby all adaptations, modifications and uses thereof which come within the practice of those skilled in the art to which the invention appertains and which fall within the scope of the appended claims.

Having thus described my invention, I claim:

1. In a machine tool, a spindle having a longitudinally extending aperture opening into its forward end, the forward portion of which aperture forms a socket for the reception of a tool-holding device to be attached to the spindle, a member within said aperture and reciprocable axially of said spindle, means operatively connected to said member for selectively connecting and disconnecting said member to and from the tool-holding device upon reciprocation of said member away from and toward the forward end of said spindle respectively, spring means interposed between said spindle and said member continuously and yieldably urging said member to a rearward position away from the forward end of said spindle, said spring means operating to bias a tool holding device secured in said member into said socket, means for moving said member forward toward the forward end of said spindle, and releasable means for securing said member in a forward position against the action of said spring.

2. In a machine tool, a spindle having a longitudinally extending aperture opening into its forward end, the forward portion of which aperture forms a socket for the reception of a tool-holding device to be attached to the spindle, a member within said aperture and reciprocable axially of said spindle to either a rearward or a forward position, means carried by said member for selectively connecting and disconnecting said member to and from the tool-holding device upon reciprocation of said member away from and toward the forward end of said spindle respectively, spring means interposed between said spindle and said member for continuously and yieldably urging said member in a rearward direction with respect to said spindle, means for moving said member forwardly in said spindle aperture against the action of said spring means, and forwardly facing fixed abutment means within said aperture and cooperating with the first said means for releasably maintaining said member in a forward position against the action of said spring means upon the removal of the tool-holding device from said socket.

3. In a machine tool, a spindle having a longitudinally extending aperture opening into its forward end, the forward portion of which aperture forms a socket for the reception of a tool-holding device to be attached to the spindle, a member within said aperture and reciprocable axially of said spindle, said member including binding means for selectively connecting and disconnecting said member to and from the tool-holding device upon reciprocation of said member away from and toward the forward end of said spindle respectively, spring means interposed between said spindle and said member for yieldably urging said member and the tool-holding device therein in a rearward direction, means for moving said member forwardly toward the forward end of said spindle against the action of said spring means, forwardly facing fixed abutment means within said aperture rearwardly of said binding means when said rear member is in its forward position and engageable with said binding means to hold said member in a forward position, a second member within and axially movable of the first said member for moving said binding means to a position for engaging said abutment means, and spring means yieldably urging said second member in a direction toward the forward portion of said spindle.

4. In a machine tool, a spindle having a longitudinally extending aperture opening into its forward end, the forward portion of which aperture forms a socket for the reception of the shank of a tool-holding device to be attached to the spindle, the tool-holding device having a forwardly facing shoulder adjacent to its rear end, a sleeve in said aperture adapted to receive the rear portion of the tool-holding device including the shoulder thereon and slidable axially of said spindle to a rearward position for binding the tool-holding device and to a forward position for releasing the tool-holding device therein, said sleeve having an opening through the wall thereof positioned forwardly of the shoulder of the tool-holding device when the device is positioned in said socket, a locking member in said opening and having a dimension greater than the thickness of the sleeve wall whereby the locking member projects from one end or the other of said opening, means carried by said sleeve for engaging and holding said member in a position wherein the latter projects outwardly from the walls of said sleeve upon removal of the tool-holding device and disengageable from said locking member by the insertion of a tool-holding device in said sleeve, fixed abutment means within said aperture external of said sleeve for engaging said locking member and preventing said sleeve from moving from a forward releasing position, spring means operatively connected to said spindle and to said sleeve for continuously urging said sleeve in a direction away from the forward end of said spindle, said spring means operating to bias a tool holding device secured in said member into said socket, and means to move said sleeve forwardly against the action of said spring means.

5. In a machine tool, a spindle having a longitudinally extending aperture opening into its forward end, the forward portion of which aperture forms a socket for the reception of the shank of a tool-holding device to be attached to the spindle, the tool-holding device having a forwardly facing shoulder adjacent to its rear end, a sleeve in said aperture adapted to receive the rear portion of the device including the shoulder thereon and slidable axially of said spindle to a rearward locking position and to a forward releasing position, said sleeve having an opening through the wall thereof positioned forwardly of the shoulder on the tool-holding device when the latter is positioned in said socket, a locking member in said opening and having a dimension greater than the thickness of the sleeve wall whereby the locking member projects from one end or the other of said opening, said sleeve including means for engaging and holding said locking member in a position wherein the latter projects outwardly from the side wall of said sleeve upon the removal of the tool-holding device and disengageable from said member by the insertion of a tool-holding device in said sleeve, abutment means within said aperture externally of said sleeve and engageable with said locking member when the sleeve is in a forward position for preventing rearward movement of said sleeve, cam means externally of said sleeve and within said aperture engageable with said locking member when said sleeve is moved in a direction away from the forward end of said spindle to urge said locking member to extend through said opening and project inside of said sleeve forwardly of the shoulder on the tool-holding device spring means operatively connected to said spindle and to said sleeve for moving said sleeve in a direction away from the forward end of said spindle, said spring means operating to bias a tool holding device secured in said sleeve into said socket.

6. In a machine tool, a spindle having a longitudinally extending aperture opening into its forward end, the forward portion of which aperture forms a socket for the reception of the shank of a tool-holding device to be attached to the spindle, the tool-holding device having a forwardly facing shoulder adjacent to its rear end, a sleeve in said aperture adapted to receive the rear portion of the tool-holding device including the shoulder thereon and slidable axially of said spindle to a rearward position connecting the tool-holding device to the spindle and to a forward position releasing the tool-holding device, said sleeve having an opening through the wall thereof positioned forwardly of the shoulder on the tool-holding device when the latter is positioned in said socket, a locking member in said opening and having a dimension greater than the thickness of the sleeve wall whereby the locking member projects from one end or the other of said opening, a holding member within said sleeve and axially movable with respect thereto for engaging said locking member and holding said locking member in an outward position with respect to said sleeve, means for biasing said holding member toward the forward part of said sleeve for engagement with said locking member upon the removal of the rear portion of the tool-holding device from said sleeve, forwardly facing fixed abutment means within said aperture externally of said sleeve for engaging said locking member and preventing movement of said sleeve from a forward releasing position, and spring means operatively connected to said spindle and to said sleeve for moving said sleeve in a direction away from the forward end of said spindle, said spring means operating to bias a tool holding device secured in said sleeve into said socket, and means for moving said sleeve to a forward position against the action of said spring.

7. In a machine tool, a spindle having a longitudinally extending aperture opening into its forward end, the forward portion of which aperture forms a socket for the reception of the shank of a tool-holding device to be attached to the spindle, the tool-holding device having a forwardly facing shoulder adjacent to the rear end of its shank, a sleeve in said aperture adapted to receive the rear portion of the shank of the tool-holding device including the shoulder thereon and slidable axially of said spindle to a rearward position binding the tool-holding device therein and to a forward position for releasing the tool-holding device, said sleeve having an opening through the wall thereof positioned forwardly of the shoulder on the tool-holding device when the latter is positioned in said socket, a locking member in said opening and having a dimension greater than the thickness of the sleeve wall whereby the locking member projects inwardly from one end or outwardly from the other end of said opening, a holding member within said sleeve and axially movable with respect thereto, means for yieldably urging said holding member toward the forward part of said spindle for engaging said locking member and holding it in an outwardly projecting position upon the removal of the rear portion of the tool-holding device from said sleeve, forwardly facing fixed abutment means within said aperture external of said sleeve, for engaging said locking member and preventing movement of said sleeve from a forward position, cam means externally of said sleeve and extending rearwardly from said abutment means for engaging said locking member when said sleeve is moved in a direction away from the forward end of said spindle and holding said locking member projecting inside of said sleeve forwardly of the position of said shoulder, spring means operatively connected to said spindle and to said sleeve for moving said sleeve in a direction away from the forward end of said spindle, spring means operating to bias a tool holding device secured in said sleeve into said socket, and means to move said sleeve forwardly against the action of said spring means.

8. In a machine tool, a spindle having an aperture opening into its forward end, the forward portion of said aperture forming a socket for the reception of a tool-holding device to be secured therein, a member within said aperture and reciprocable axially of said spindle, means operatively connected to said member for selectively connecting and disconnecting said member to and from the tool-holding device upon reciprocation of said member away from and toward the forward end of said spindle respectively, spring means interposed between said member and said spindle for continuously and yieldably urging said member in a rearward direction with respect to said spindle, and means within said spindle aperture for releasably securing said member in a forward position upon the removal of the tool-holding device and actuatable to a released position by the insertion of a tool-holding device in said socket for permitting rearward movement of the member by said spring means.

9. In a machine tool, a tool spindle having a longitudinally extending aperture opening into its forward end, the forward portion of which aperture forms a socket for the reception of a tool-holding device to be attached to the spindle, an axially reciprocable member within said aperture, means operatively connected to said member for selectively connecting and disconnecting said member to and from the tool-holding device upon reciprocation of said member away from and toward the forward end of said spindle respectively, spring means operatively connected between said spindle and said member for yieldably and continuously urging said member in a rearward direction with respect to said spindle, means for moving said member forwardly with respect to said spindle to release the tool-holding device therein, and releasable means for releasably securing said member in a forward position upon the removal of the tool-holding device including an element operatively connected to said member and movable therewith and an element carried by said spindle fixed against movement along the axis of said spindle and engageable with the first-mentioned element to prevent movement of said member in a rearward direction.

10. In a machine tool, a tool spindle having an aperture opening into its forward end, the forward portion of said aperture forming a socket for the reception of a tool-holding device to be secured therein, a reciprocable member within said aperture adapted to receive the rear portion of the tool-holding device, binding means carried by said member for selectively connecting the tool-holding device to said member upon movement of the member to a rearward position in said aperture and for selectively disconnecting the tool-holding device from said member upon movement of the member to a forward position in said aperture, spring means interposed between said member and said spindle continuously and yieldably urging said member and the tool-holding device connected thereto in a rearward direction with respect to said spindle, forwardly facing fixed abutment means in said aperture positioned rearwardly of said binding means when said member is in its forward position for cooperating with said binding means for preventing movement of said member in a rearward direction, means within said member for holding said binding means in a position to engage said abutment means upon removal of the tool-holding device and moved to a position permitting disengagement of said binding means and said abutment means by the insertion of a tool-holding device in said aperture, and means for moving said member in a forward direction against the bias of said spring means.

11. In a machine tool, a tool spindle having a longitudinally extending aperture opening into its forward end, the forward portion of which aperture forms a socket for the reception of the shank of a tool-holding device to be attached to the spindle, the tool-holding device having a forwardly facing shoulder adjacent to its rearward end, an axially slidable sleeve within said aperture adapted to receive the rear portion of the tool-holding device including the forwardly facing shoulder thereon, said sleeve having an opening through the wall thereof positioned forwardly of the shoulder on the tool-holding device when the latter is seated in said socket, a locking member in said opening for engaging the shoulder of the tool-holding device and preventing forward movement of the device, said locking member having a dimension greater than the thickness of the sleeve wall whereby the locking member projects from one end or the other of said opening, a holding member within said sleeve and axially movable with respect thereto from a rearward position to a forward position wherein the holding member engages and urges the locking member to a position projecting from the external side of said sleeve, said aperture being formed to permit said locking member to move outwardly of said sleeve when said sleeve is in a forward position in said aperture, spring means connected between said sleeve and said holding member for biasing said holding member forwardly with respect to said spindle to urge said holding member toward engagement with said locking member, forwardly facing fixed abutment means within said aperture and rearwardly of said locking member when said sleeve is in a forward postion and engageable with said locking member for preventing rearward movement of said sleeve upon removal of the tool-holding device, said holding member being moved rearwardly against the bias of said spring means to permit rearward movement of said sleeve upon insertion of a tool-holding device in said socket, cam means externally of said sleeve and within said aperture and extending rearwardly from said abutment means and engageable with said locking member upon movement of said sleeve rearwardly from its forward position wherein said locking member engages said abutment means, spring means operatively connected to said spindle and to said sleeve continuously and yieldably biasing said sleeve in a rearward direction with respect to said spindle, and means moving said sleeve forwardly against the bias of the last-said spring means.

References Cited in the file of this patent

UNITED STATES PATENTS

| | | |
|---|---|---|
| Re. 13,724 | Lindberg | May 12, 1914 |
| 1,119,276 | Griffith et al. | Dec. 1, 1914 |
| 1,168,540 | Musselman | Jan. 18, 1916 |
| 1,353,299 | Wilson | Sept. 21, 1920 |
| 1,961,129 | DeHaas | June 5, 1934 |
| 2,501,421 | Stephan | Mar. 21, 1950 |
| 2,597,816 | Podjaski | May 20, 1952 |

FOREIGN PATENTS

| | | |
|---|---|---|
| 342,678 | Great Britain | Jan. 26, 1931 |
| 113,486 | Sweden | Mar. 13, 1945 |
| 912,663 | France | July 23, 1945 |